(12) United States Patent
Mashiko et al.

(10) Patent No.: US 10,525,579 B2
(45) Date of Patent: Jan. 7, 2020

(54) ELECTRIC TOOL

(71) Applicant: HITACHI KOKI CO., LTD., Tokyo (JP)

(72) Inventors: Hironori Mashiko, Ibaraki (JP); Kazutaka Iwata, Ibaraki (JP); Yuta Noguchi, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 392 days.

(21) Appl. No.: 15/531,737

(22) PCT Filed: Nov. 27, 2015

(86) PCT No.: PCT/JP2015/083426
§ 371 (c)(1),
(2) Date: May 31, 2017

(87) PCT Pub. No.: WO2016/098563
PCT Pub. Date: Jun. 23, 2016

(65) Prior Publication Data
US 2017/0341213 A1    Nov. 30, 2017

(30) Foreign Application Priority Data

Dec. 18, 2014 (JP) .................... 2014-256488

(51) Int. Cl.
*B25F 5/00* (2006.01)
*B25B 23/147* (2006.01)
(Continued)

(52) U.S. Cl.
CPC .............. *B25F 5/00* (2013.01); *B24B 23/028* (2013.01); *B25B 21/02* (2013.01); *B25B 23/147* (2013.01);
(Continued)

(58) Field of Classification Search
CPC ...... B25B 21/00; B25B 21/004; B25B 23/045; B25B 23/14; B25B 23/1405;
(Continued)

(56) References Cited

U.S. PATENT DOCUMENTS 5,410,229 A * 4/1995 Sebastian .................. H02P 3/08
318/434
6,836,614 B2 * 12/2004 Gilmore ................ B23P 19/066
173/176
(Continued)

FOREIGN PATENT DOCUMENTS

| CN | 102947057 | 2/2013 |
|---|---|---|
| EP | 1777792 | 4/2007 |

(Continued)

OTHER PUBLICATIONS

"Search Report of European Counterpart Application" dated Sep. 17, 2018, p. 1-p. 8.
(Continued)

*Primary Examiner* — Scott A Smith
(74) *Attorney, Agent, or Firm* — JCIPRNET

(57) ABSTRACT

In order to provide an electric tool with good operability that can extend the life of and suppress breakage of a switching element for controlling energization of a brushless motor, a control unit (50), after an operation switch (5) is turned off, does not immediately turn off an inverter circuit (43) (does not set the duty of a PWM signal to 0), and instead normally operates the inverter circuit (43) with a low-duty PWM signal and waits until a rotation speed of a brushless motor (6) reaches a predetermined rotation speed or less to turn off the inverter circuit (43) (to set the duty of the PWM signal to 0).

11 Claims, 7 Drawing Sheets

(51) Int. Cl.
| | |
|---|---|
| *B25B 21/02* | (2006.01) |
| *B24B 23/02* | (2006.01) |
| *H02P 6/18* | (2016.01) |
| *H02P 6/24* | (2006.01) |
| *H02P 6/06* | (2006.01) |
| *B25B 23/04* | (2006.01) |
| *B25B 21/00* | (2006.01) |
| *H02K 7/14* | (2006.01) |
| *H02P 6/08* | (2016.01) |
| *H02P 29/02* | (2016.01) |

(52) U.S. Cl.
CPC ............. *B25F 5/001* (2013.01); *H02P 6/18* (2013.01); *H02P 6/24* (2013.01); *B25B 21/004* (2013.01); *B25B 23/045* (2013.01); *H02K 7/145* (2013.01); *H02P 6/06* (2013.01); *H02P 6/08* (2013.01); *H02P 29/02* (2013.01)

(58) Field of Classification Search
CPC ..... B25B 23/1475; B25B 23/147; B25F 5/00; B25F 5/02; B25F 5/001; B23D 75/005; B24B 23/02; B24B 23/028; B24B 55/00; H02P 6/15; H02P 6/06; H02P 6/08; H02P 6/153; H02P 6/18; H02P 6/085; H02P 25/14; H02P 29/02; H02K 7/145; H02K 11/33; H02K 29/08
USPC ......... 173/2, 4, 11, 176, 178, 179, 181, 183, 173/217, 47; 318/490, 434, 432, 430, 318/162, 400.01, 472, 471, 717, 634
See application file for complete search history.

(56) References Cited

U.S. PATENT DOCUMENTS

| | | | | |
|---|---|---|---|---|
| 7,331,406 B2 * | 2/2008 | Wottreng, Jr. | ........ | B25B 23/045 173/176 |
| 7,551,411 B2 * | 6/2009 | Woods | .................. | B24B 23/028 318/434 |
| 7,770,658 B2 * | 8/2010 | Ito | .................. | B23P 19/066 173/1 |
| 7,821,217 B2 * | 10/2010 | Abolhassani | ........... | H02P 6/153 173/141 |
| 8,286,723 B2 * | 10/2012 | Puzio | .................. | B25B 23/0064 173/1 |
| 8,616,299 B2 * | 12/2013 | Ichikawa | .................. | H02P 6/06 173/176 |
| 8,689,900 B2 * | 4/2014 | Miwa | .................. | B25F 5/001 173/176 |
| 8,919,456 B2 * | 12/2014 | Ng | .................. | G05B 15/02 173/11 |
| 9,296,095 B2 * | 3/2016 | Yoshino | .................. | B25B 23/1475 |
| 9,475,180 B2 * | 10/2016 | Eshleman | .................. | B25B 21/004 |
| 2003/0121685 A1 * | 7/2003 | Yamamoto | .................. | B25B 21/00 173/217 |
| 2011/0000688 A1 * | 1/2011 | Iwata | .................. | B25B 21/00 173/1 |
| 2011/0284256 A1 * | 11/2011 | Iwata | .................. | B25F 5/00 173/176 |
| 2013/0082631 A1 * | 4/2013 | Suzuki | .................. | B25F 5/00 318/461 |
| 2013/0264987 A1 * | 10/2013 | Uchida | .................. | H02K 7/145 318/495 |
| 2016/0001411 A1 * | 1/2016 | Alberti | .................. | B25B 23/14 700/188 |

FOREIGN PATENT DOCUMENTS

| | | |
|---|---|---|
| EP | 2442439 | 4/2012 |
| EP | 2572832 | 3/2013 |
| JP | H02223396 | 9/1990 |
| JP | H03112386 | 5/1991 |
| JP | 2005176454 | 6/2005 |
| JP | 2007275999 | 10/2007 |
| JP | 2011136399 | 7/2011 |
| JP | 2012000726 | 1/2012 |
| WO | 2014144946 | 9/2014 |

OTHER PUBLICATIONS

"International Search Report (Form PCT/ISA/210) of PCT/JP2015/083426", dated Jan. 26, 2016, with English translation thereof, pp. 1-4.

"Office Action of China Counterpart Application," dated Dec. 3, 2018, with English translation thereof, p. 1-p. 17.

"Office Action of China Counterpart Application," with English translation thereof, dated Jul. 25, 2019, p. 1-p. 13.

* cited by examiner

ELECTRIC TOOL

CROSS-REFERENCE TO RELATED APPLICATION

This application is a 371 application of the international PCT application serial no. PCT/JP2015/083426, filed on Nov. 27, 2015, which claims the priority benefit of Japan application no. 2014-256488, filed on Dec. 18, 2014. The entirety of each of the above—mentioned patent applications is hereby incorporated by reference herein and made a part of this specification.

TECHNICAL FIELD

The present invention relates to an electric tool such as a grinder and an impact tool.

BACKGROUND ART

In electric tools such as grinders or impact tools, automatically performing braking if manipulation switches such as triggers are turned off is known. In the case of an electric tool using a brushless motor as a driving source, only a switching element on a lower arm side of an inverter circuit by which a current is supplied to the brushless motor is turned on and a closed circuit including the brushless motor is formed, so that rotational energy is consumed as electric energy and braking can be performed (a brake can be applied).

CITATION LIST

Patent Literature

[Patent Literature 1]
Japanese Unexamined Patent Application Publication No. 2007-275999

SUMMARY OF INVENTION

Technical Problem

In an electric tool, a rotating tool can be made to rapidly stop when a manipulation switch has been turned off due to braking being preformed. However, a user may need to perform a task using inertia after a manipulation switch has been turned off. Thus, it can be conceived that braking may not be actively performed when a manipulation switch has been turned off and an inverter circuit is turned off (a switching element configured to control supply of electricity to a brushless motor is turned off). However, if the inverter circuit is turned off, a high counter-electromotive voltage occurring in a stator coil due to rotation of a rotor caused by inertia after the manipulation switch has been turned off is applied to the switch element and thus this is not preferable in terms of lengthening of a lifetime of a switching element and breakage prevention.

The present invention was made in view of such circumstances, and the present invention is for the purpose of providing an electric tool with good operability that can extend the life of and suppress breakage of a switching element for controlling energization of a brushless motor.

Solution to Problem

An aspect of the present invention is an electric tool. The electric tool includes: a manipulation switch; a brushless motor; a rotating tool driven through the brushless motor; a switching element configured to control supply of electricity to the brushless motor; and a control unit configured to control turning on/off of the switching element, wherein the control unit lowers a duty of a driving signal of the switching element such that it becomes lower than a duty when the manipulation switch is turned into a first state and down to a predetermined value larger than 0 if the manipulation switch is in the first state.

The control unit may lower the duty to 0 after the duty has been lowered to the predetermined value.

The control unit may lower the duty to 0 after maintaining the duty at the predetermined value and driving the brushless motor.

The control unit may lower the duty to 0 if the rotation rate of the brushless motor is a predetermined rotation rate or less.

The brushless motor may be allowed to stop through natural deceleration if the duty is 0.

The control unit may control electrical brake after maintaining the duty at the predetermined value and driving the brushless motor.

An aspect of the present invention is an electric tool. The electric tool includes: a manipulation switch; a brushless motor; a rotating tool driven through the brushless motor; a switching element configured to control supply of electricity to the brushless motor; and a control unit configured to control turning on/off of the switching element, wherein the control unit lowers a duty of a driving signal of the switching element to a predetermined value larger than 0, maintains the duty at the predetermined value, drives the brushless motor, and then lowers the duty to 0 if the manipulation switch is a first state.

The control unit may lower the duty from the predetermined value to 0 if a rotation rate of the brushless motor is a predetermined rotation rate or less, after the manipulation switch has been the first state and the duty has been lowered to the predetermined value.

The brushless motor may stop through natural deceleration if the duty is 0.

The control unit may perform braking of the brushless motor after the manipulation switch has been the first state and the duty has been lowered to 0.

The control unit may gradually lower the duty when the manipulation switch has been the first state and the duty has been lowered to the predetermined value.

The control unit may set a rate of decrease of the duty when the manipulation switch has been the first state and the duty has been lowered to the predetermined value in accordance with a moment of inertia of the rotating tool.

The control unit may increase the duty to a target value if the manipulation switch is a second state, while the duty is being lowered to the predetermined value or is maintained at the predetermined value after the manipulation switch has been the first state.

Another aspect of the present invention is an electric tool. The electric tool includes: a manipulation switch; a brushless motor; a rotating tool driven through the brushless motor; a switching element configured to control supply of electricity to the brushless motor; and a control unit configured to control turning on/off of the switching element, wherein the control unit lowers a duty of a driving signal of the switching element to a predetermined value larger than 0 if the manipulation switch is changed from an on state to an off state and lowers the duty from the predetermined value to 0 if a rotation rate of the brushless motor is a predetermined rotation rate or less.

The brushless motor may stop through natural deceleration if the duty is 0.

Note that any combination of the above-described constituent elements and expressions obtained by converting expression of the present invention into methods, systems, or the like are effective as aspects of the present invention.

Advantageous Effects Of Invention

According to the present invention, an electric tool with good operability that can extend the life of and suppress breakage of a switching element for controlling energization of a brushless motor can be provided.

BRIEF DESCRIPTION OF DRAWINGS

FIG. 2 is a side cross-sectional view when the manipulation switch 5 of the grinder 1 is turned on.

DESCRIPTION OF EMBODIMENTS

Figure 1:
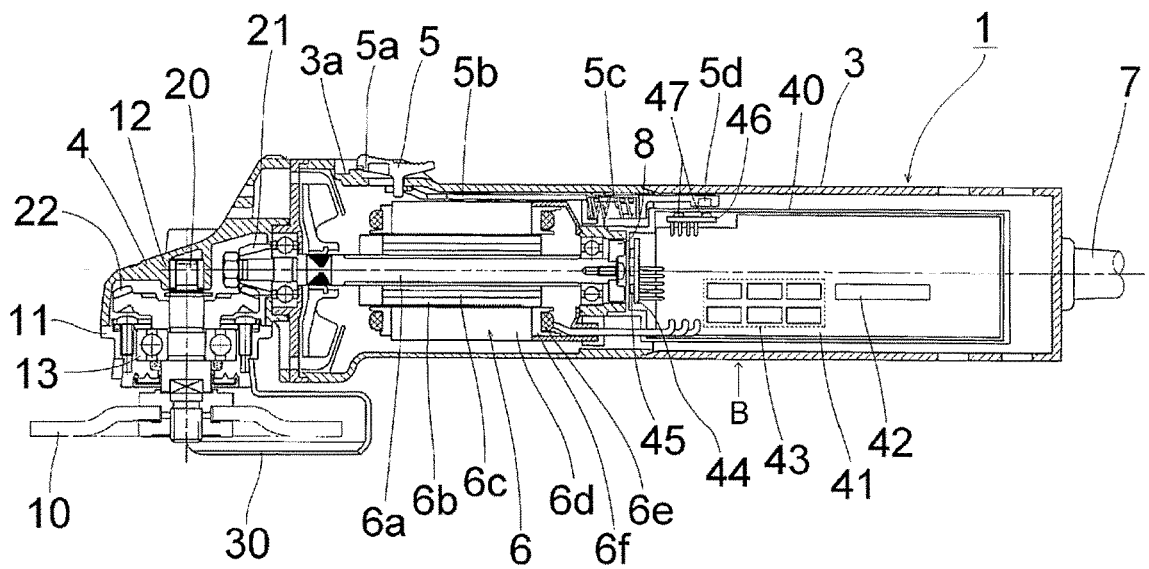
FIG. 1 is a side cross-sectional view when a manipulation switch 5 of a grinder 1 serving as an electric tool related to Embodiment 1 of the present invention is turned off.

Hereinafter, preferred embodiments of the present invention will be described in detail with reference to the drawings. Note that the same or equivalent constituent elements, members, process, and the like shown in the drawings are denoted with the same reference numerals and repeated descriptions thereof will be appropriately omitted. Furthermore, embodiments do not limit the invention and are merely examples. In addition, all of the features and combinations thereof described in the embodiments are not necessarily essential to the invention.

Embodiment 1

Figure 2:
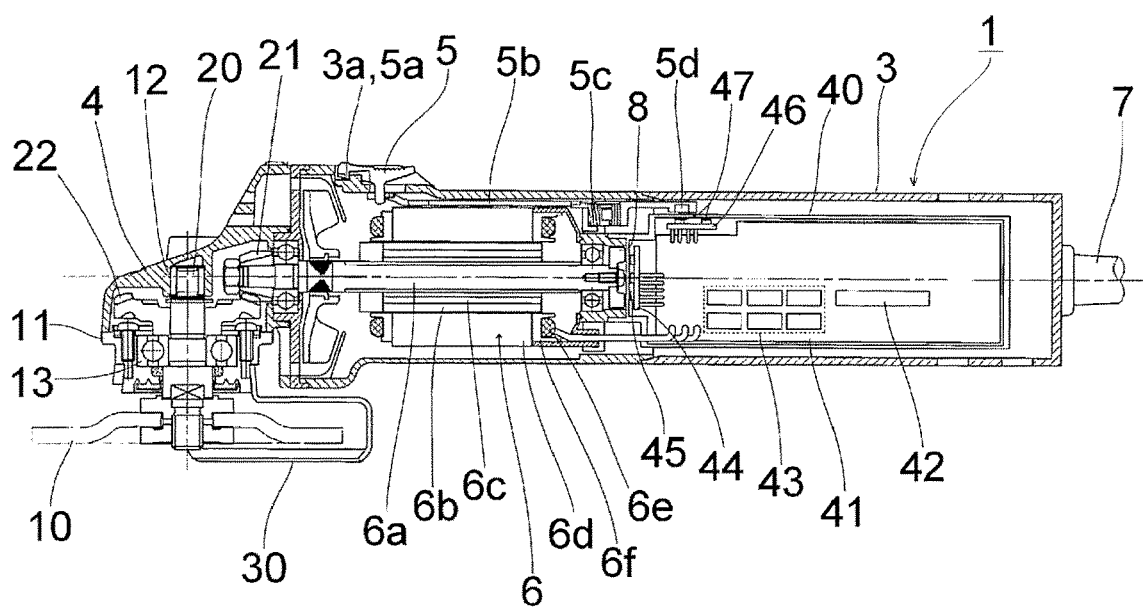
Figure 3A:
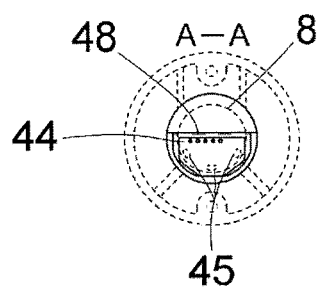
FIG. 3(A) is a cross-sectional view taken along line A-A of FIG. 3(B).
Figure 3B:
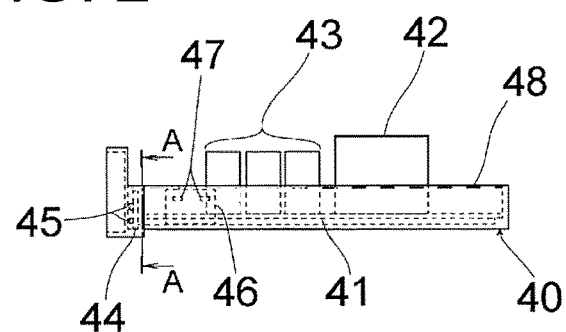
FIG. 3(B) is a diagram viewed in a direction of an arrow when a controller box 40 of FIG. 1 is viewed from a B direction.

FIG. 1 is a side cross-sectional view when a manipulation switch 5 of a grinder 1 serving as an electric tool related to Embodiment 1 of the present invention is turned off FIG. 2 is a side cross-sectional view when the manipulation switch 5 of the grinder 1 is turned on. FIG. 3(A) is a cross-sectional view taken along line A-A of FIG. 3(B). FIG. 3(B) is a diagram viewed in a direction of an arrow when a controller box 40 of FIG. 1 is viewed from a B direction.

As shown in FIG. 1, the grinder 1 includes a whetstone 10 serving as a rotating tool and is used for a grinding task and the like configured to flatten a surface of concrete, stone, or the like. Note that a circular disc-shaped brush, cutter, or the like can also be attached as a rotating tool in addition to a circular disc-shaped grinding whetstone or cutting whetstone. The grinder 1 includes a housing 3 (which is made of, for example, a resin) and a gear case 4.

The housing 3 has a substantially cylindrical shape as a whole and a brushless motor 6 serving as a motor is accommodated inside the housing 3. The brushless motor 6 is connected to an external alternating current (AC) power supply such as a commercial power supply via a power cord 7 drawn from a rear end of the housing 3. A first bevel gear 21 is provided in a front end portion of an output shaft 6a of the brushless motor 6. A manipulation switch (a trigger switch) 5 configured to switch supply of electricity to the brushless motor 6 on/off is provided in the housing 3. The manipulation switch 5 is biased rearward (in a direction in which it is turned off) by a spring 5c, but a locking projection 5a is hooked to a locking recess 3a of the housing 3 as shown in FIG. 2 by causing the manipulation switch 5 to slide forward so that the manipulation switch 5 can be locked in an on state.

The gear case 4 is made of, for example, a metal such as an aluminum alloy and is attached to a front end portion of the housing 3. An opening of the gear case 4 is blocked by a packing gland 11 serving as a lid member. The packing gland 11 is fixed to the gear case 4 using, for example, screws or the like. The packing gland 11 is a holding member configured to hold a wheel guard 30 which will be described later. Two bearings (a needle bearing 12 and a ball bearing 13) are provided inside the gear case 4 and a spindle 20 is rotatably held by the bearings. The spindle 20 is orthogonal to the output shaft 6a of the brushless motor 6 and one end thereof passes through the packing gland 11 and protrudes to an outside. On the other hand, a second bevel gear 22 engaging with the first bevel gear 21 attached to the output shaft 6a of the brushless motor 6 is provided on (attached to) the other end of the spindle 20 located inside the gear case 4. In the case of rotation of the brushless motor 6, a direction of rotation thereof is changed by 90 degrees through the first bevel gear 21 and the second bevel gear 22, a rotational speed thereof decreases, and the force thereof is transferred to the spindle 20. In other words, the spindle 20 is rotatably driven using the brushless motor 6.

The whetstone 10 is fixed to the spindle 20 using wheel washers and lock nuts and integrally rotates with the spindle 20. If the manipulation switch 5 provided in the housing 3 is manipulated, power is supplied to the brushless motor 6 and the output shaft 6a of the brushless motor 6 rotates. Thus, the spindle 20 joined to the output shaft 6a via the first bevel gear 21 and the second bevel gear 22 rotates and the whetstone 10 fixed to the spindle 20 rotates. The wheel guard 30 covering at least ½ or more of an outer circumference of the whetstone 10 is attached to the packing gland 11. The wheel guard 30 can be subjected to rotation restriction so that its turning position does not change while working and change its turning position according to work details if the rotation restriction is released.

A rotor core 6b made of a magnetic body integrally rotating with the output shaft 6a is provided near the output shaft 6a. A plurality of (for example, four) rotor magnets 6c are inserted into the rotor core 6b and held. A stator core 6d is provided near the rotor core 6b (is fixed to the housing 3). A stator coil 6e is provided on the stator core 6d with an insulator 6f therebetween. Note that the brushless motor 6 may be an induction motor having no permanent magnet in a rotor.

A controller box 40 is provided behind the brushless motor 6 inside the housing 3. A main board 41, a sensor board 44, and a switch board 46 are accommodated in the controller box 40 and the controller box 40 is filled with a urethane 48 as shown in FIGS. 3(A) and 3(B). A diode bridge 42, an inverter circuit 43, a controller 54 shown in FIG. 4, and the like are provided in the main board 41. The sensor board 44 faces a sensor magnet 8 provided on a rear end portion of the output shaft 6a of the brushless motor 6. Three Hall integrated circuits (ICs) (magnetic sensors) 45 are provided on a facing surface of the sensor board 44 with respect to the sensor magnet 8, for example, at 60° intervals. A magnetic field occurring in the sensor magnet 8 is detected by the Hall ICs 45 so that a rotational position (a rotor position) of the brushless motor 6 can be detected. The switch board 46 faces a switch magnet 5d provided on a distal end of a slide bar 5b sliding in cooperation with manipulation of the manipulation switch 5. Two Hall ICs (magnetic sensors) 47 are provided on a facing surface of the switch board 46 with respect to the switch magnet 5d. The switch magnet 5d directly faces any of the Hall ICs 47 in response to on/off of the manipulation switch 5.

Figure 4:
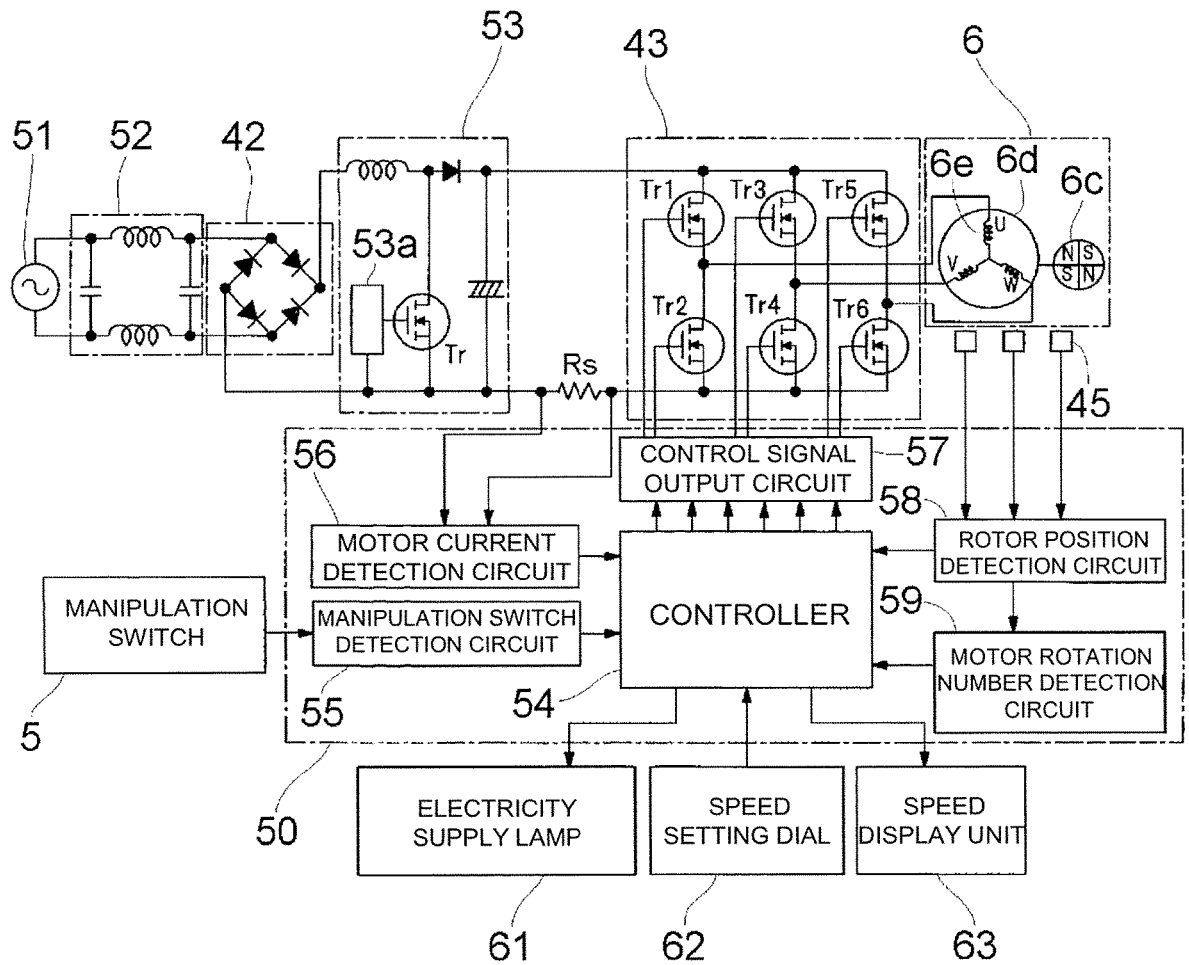
FIG. 4 is a control block diagram of the grinder 1.

FIG. 4 is a control block diagram of the grinder 1. The diode bridge 42 is connected to an AC power supply 51 via a filter circuit 52 for controlling noise. The inverter circuit 43 is provided on an output terminal of the diode bridge 42 via a power factor improvement circuit 53. The power factor improvement circuit 53 includes, for example, a transistor Tr constituted of a metal-oxide-semiconductor field-effect transistor (MOSFET) and a gate driver IC 53a configured to output a pulse-width modulation (PWM) control signal to a gate of the transistor Tr and functions to minimize harmonic currents occurring in switching elements of the inverter circuit 43 to a limit value or less. The inverter circuit 43 is, for example, obtained by performing three-phase bridge connection on switching elements Tr1 to Tr6 constituted of MOSFETs and supplies a driving current to the brushless motor 6. Note that the switching elements Tr1 to Tr6 may be insulated gate bipolar mode transistors (IGBTs) and power devices appropriate for a switching operation. Furthermore, the power factor improvement circuit 53 may not be provided and a size of the electric tool can be reduced by decreasing the number of parts. A detection resistor Rs converts a current flowing through the brushless motor 6 (the inverter circuit 43) into a voltage.

In FIG. 4, a manipulation switch detection circuit 55 corresponds to the two Hall ICs 47 mounted on the switch board 46 of FIG. 1 and transmits a switch manipulation detection signal to the controller 54 in accordance with a position (on/off) of the manipulation switch 5. A controller 54 turns on an electricity supply lamp 61 if it is detected that the manipulation switch 5 is turned on through a switch manipulation detection signal. A motor current detection circuit 56 determines a current flowing through the brushless motor 6 on the basis of a terminal voltage of the detection resistor Rs and transmits a motor current detection signal to the controller 54. A control signal output circuit (a gate driver IC) 57 applies a driving signal such as a PWM signal to gates of switching elements constituting the inverter circuit 43 in response to control of the controller 54.

A rotor position detection circuit 58 detects a rotational position of a rotor of the brushless motor 6 on the basis of output signals of the Hall ICs 45 and transmits a rotor position detection signal to the controller 54 and a motor rotation number detection circuit 59. The motor rotation number detection circuit 59 detects the rotation rate of the brushless motor 6 on the basis of the rotor position detection signal from the rotor position detection circuit 58 and transmits a motor rotation number detection signal to the controller 54. The controller 54 controls a control signal output circuit 57 in accordance with a switch manipulation detection signal, a motor current detection signal, the rotor position detection signal, and a motor rotation number detection signal, and a position of a speed setting dial 62, drives switching elements constituting the inverter circuit 43, and rotatably drives the brushless motor 6. The controller 54 notifies a user of a rotational speed of the brushless motor 6 through a speed display unit 63.

When braking is performed in the grinder 1, electrical braking (an electric brake) can be used. To be specific, in FIG. 4, a control unit 50 can turn off switching elements Tr1, Tr3, and Tr5 at a high side and turn on at least one of switching elements Tr2, Tr4, and Tr6 at a low side among a plurality of switching elements constituting the inverter circuit 43 to perform electrical braking. For example, if the switching element Tr2 at the low side is turned on, a closed circuit obtained by connecting the switching element Tr2, a U-phase winding and a V-phase winding of the stator coil 6e, and a parasitic diode of the switching element Tr4 is formed, power occurring due to rotation of a rotor core 6b is consumed in the closed circuit, and thus the rotation of the rotor core 6b can be decelerated. The switching element Tr2 is turned on/off due to a PWM signal and thus an electrical braking force at this time can change the electrical braking force in accordance with a duty ratio of an on period of time. A braking force becomes larger when the duty ratio of the on period of time is larger. Furthermore, the electrical braking force can be changed in accordance with the number of switching elements which are turned on at the time of braking among the switching elements Tr2, Tr4, and Tr6 at the low side and a braking force becomes larger when the number of switching elements which are turned on becomes larger. The control unit 50 can generate any braking force using a combination of a number of switching elements which are turned on at the time of braking among the switching elements Tr2, Tr4, and Tr6 at the low side and the duty ratio of the on period of time. An electric brake may be applied after the duty ratio is lowered to a predetermined value (for example, 10%) larger than zero, after such a state is maintained for a predetermined time, or after the rotation rate of the brushless motor 6 is the predetermined rotation rate or less. Thus, a high counter-electromotive voltage occurring in a stator coil due to rotation of a rotor caused by inertia after a manipulation switch has been turned off can be suppressed from being applied to switching elements and thus a lifetime of the switching elements can be lengthened and breakage thereof can be suppressed.

Figure 5:
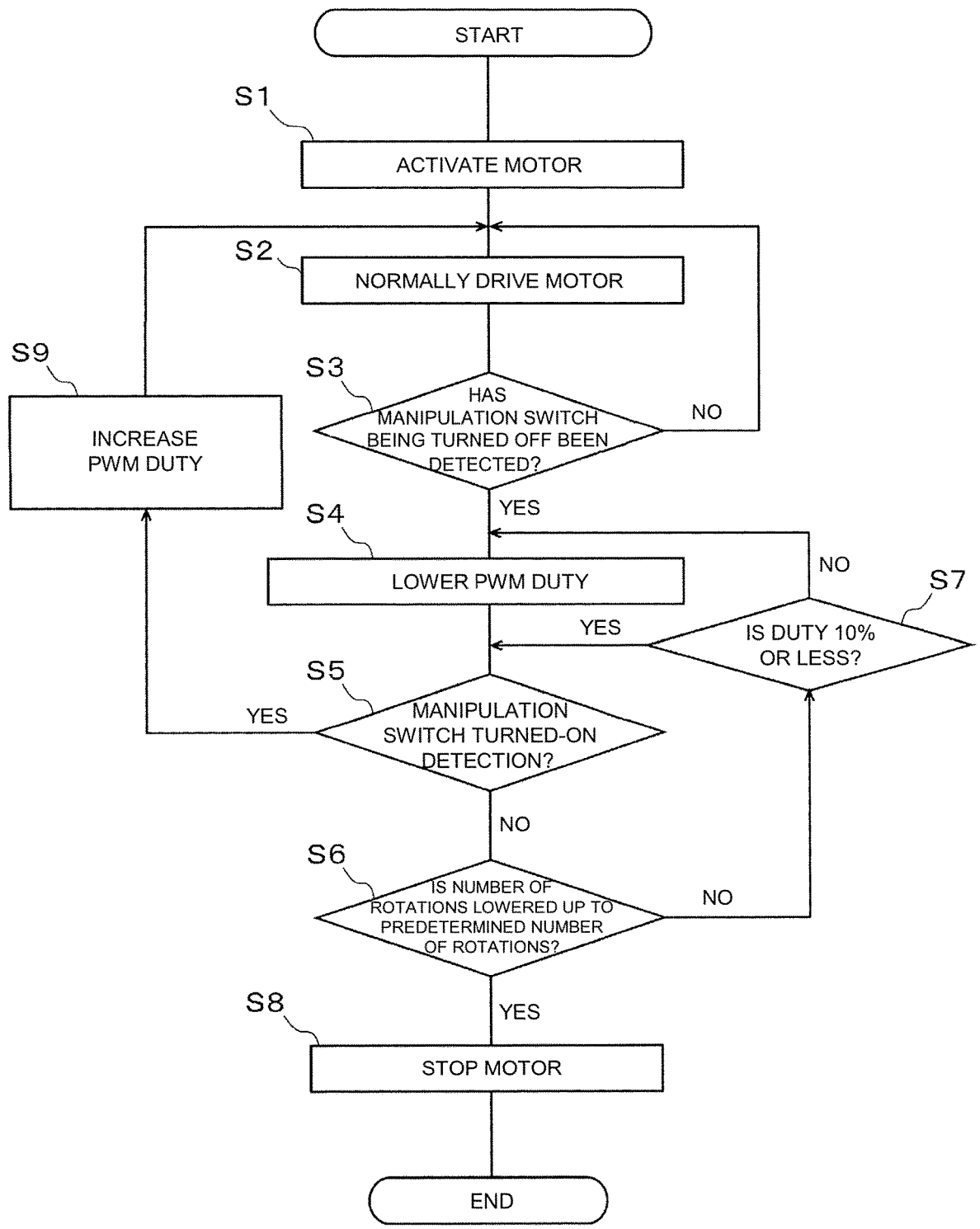
FIG. 5 is a control flowchart of the grinder 1.

FIG. 5 is a control flowchart of the grinder 1. An operation of the flowchart starts when the user turns on the manipulation switch 5. Note that, in the case of the manipulation switch 5, an off state corresponds to a first state and an on state corresponds to a second state. The control unit 50 first performs an activation process on the brushless motor 6 (S1). The activation process may be soft start control in which a duty of a PWM signal applied to gates of switching elements constituting the inverter circuit 43 is gradually increased toward a target duty. After that, the control unit 50 maintains the duty of the PWM signal at the target duty and drives the brushless motor 6 normally (S2).

The control unit 50 normally continues to drive the brushless motor 6 (S2) while it is not detected that the manipulation switch 5 has been turned off (No in S3). The control unit 50 lowers the duty of the PWM signal toward a predetermined value (here, for example, 10%) (S4) if it is detected that the manipulation switch 5 has been turned off (Yes in S3). At this time, the control unit 50 may lower the duty of the PWM signal at once and may gradually lower the duty of the PWM signal. Furthermore, a rate of decrease of the duty may be set in accordance with a moment of inertia of a mounted rotating tool. For example, in the case of a rotating tool with a large moment of inertia, a rate of decrease of a duty (and a rate of increase of duty in Step S9 which will be described later) may be increased and in the case of a rotating tool with a small moment of inertia, a rate of decrease of a duty (and a rate of increase of the duty in Step S9 which will be described later) may be decreased. The moment of inertia can be determined on the basis of a rate of change with respect to time of the rotation rate of the brushless motor 6, for example, when the activation process of the brushless motor 6 (S1) or when the duty of the PWM signal is lowered after the manipulation switch 5 has been turned off When the moment of inertia is determined after the manipulation switch 5 has been turned off, a period of time (a inertia moment determination period of time) during which decrease control of the duty may be performed independently of the moment of inertia is provided before the moment of inertia has been determined and the duty may be lowered at a rate of decrease according to the moment of inertia after the moment of inertia has been determined. Note that, although the predetermined value of the duty of the PWM signal (a target value after the decrease) is not particularly limited, for example, 5 to 10% is appropriate.

The control unit 50 continues to lower the duty of the PWM signal (No in S7) if it is not detected that the manipulation switch 5 has been turned on (No in S5) and the rotation rate of the brushless motor 6 is not lowered to the predetermined rotation rate (No in S6) while the duty of the PWM signal is being lowered toward 10%. On the other hand, the control unit 50 continues to maintain the duty of the PWM signal at 10% (Yes in S7) if it is not detected that the manipulation switch 5 has been turned on (No in S5) and the rotation rate of the brushless motor 6 is not lowered to the predetermined rotation rate (No in S6) while the duty of the PWM signal has been lowered to 10% and maintained at 10%.

The control unit 50 performs a stop operation of the brushless motor 6 (S8) if it is not detected that the manipulation switch 5 has been turned on (No in S5) and it is detected that the rotation rate of the brushless motor 6 has been lowered to the predetermined rotation rate or less (Yes in S6) after the duty of the PWM signal has been lowered. The stop operation may be an operation in which the duty of the PWM signal is set to 0 (the inverter circuit 43 is turned off) and thus the brushless motor 6 naturally decelerates and stops or an operation in which the above-described electrical braking is performed after the duty of the PWM signal has been set to 0.

On the other hand, the control unit 50 increases the duty of the PWM signal toward the target duty (S9) and normally drives the brushless motor 6 again (S2) if it is detected that the manipulation switch 5 has been turned on (Yes in S5) while the duty of the PWM signal is being lowered toward 10% or while the duty of the PWM signal has been lowered to 10% and maintained at 10%.

Figure 6:
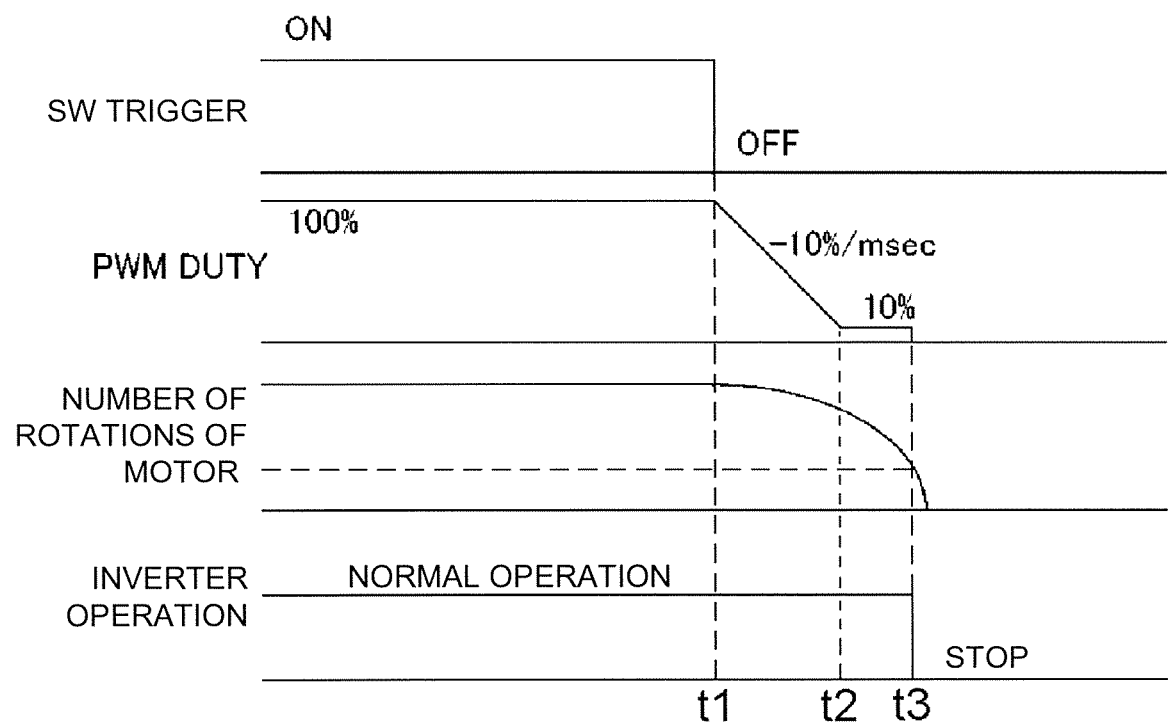
FIG. 6 is a first time chart for describing an operation of the grinder 1.

FIG. 6 is a first time chart for describing an operation of the grinder 1. The time chart illustrates a case in which the control unit 50 has normally driven the brushless motor 6. The control unit 50 starts to lower a duty of a PWM signal applied to gates of switching elements constituting the inverter circuit 43 at a rate of 10% per second from 100% (a target duty at the time of normal driving) if the manipulation switch 5 has been turned off at a time t1. The control unit 50 maintains the duty at 10% if the duty of the PWM signal is 10% at a time t2. The control unit 50 stops the inverter circuit 43 (sets the duty of the PWM signal to 0) if the brushless motor 6 has the predetermined rotation rate or less at a time t3. After that, the above-described electrical braking may be performed. After the inverter circuit 43 stops, the brushless motor 6 also decelerates and finally stops.

Figure 7:
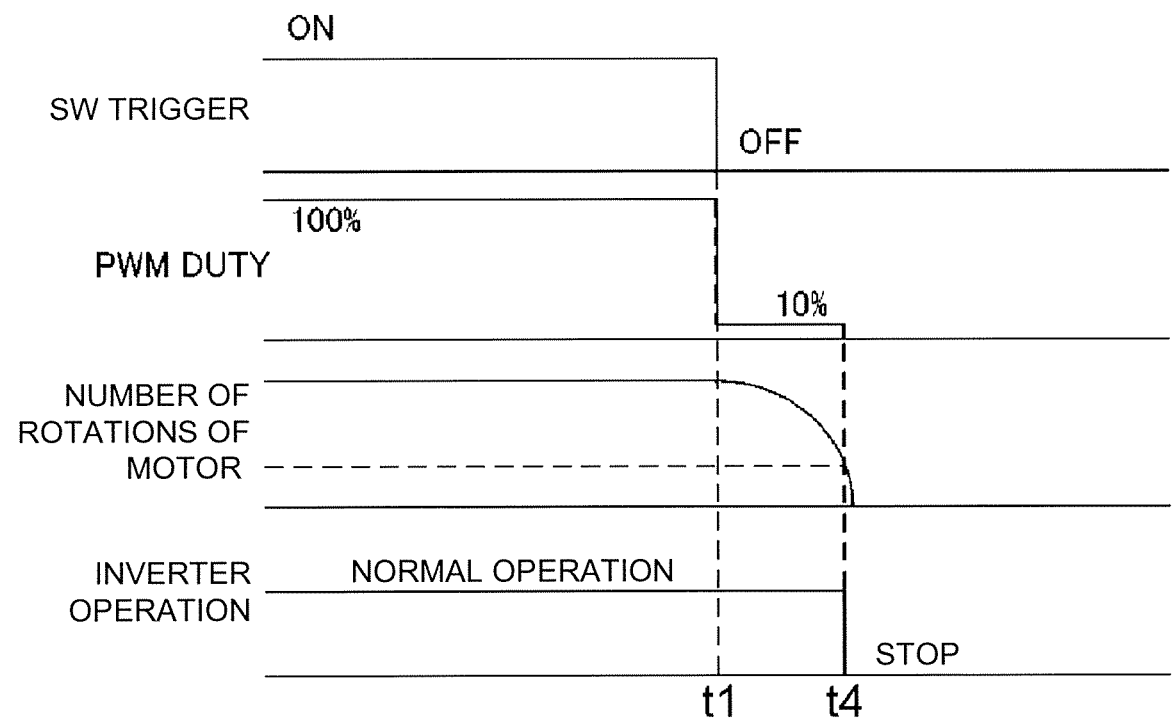
FIG. 7 is a second time chart for describing an operation of the grinder 1.

FIG. 7 is a second time chart for describing an operation of the grinder 1. The control unit 50 lowers a duty of a PWM applied to gates of switching elements constituting the inverter circuit 43 from 100% to 10% at once and then maintains the duty at 10% if the manipulation switch 5 has been turned off at the time t1. The control unit 50 stops the inverter circuit 43 if the brushless motor 6 has the predetermined rotation rate or less at a time t4. After that, the above-described electrical braking may be performed. After the inverter circuit 43 stops, the brushless motor 6 further decelerates and finally stops.

Figure 8:
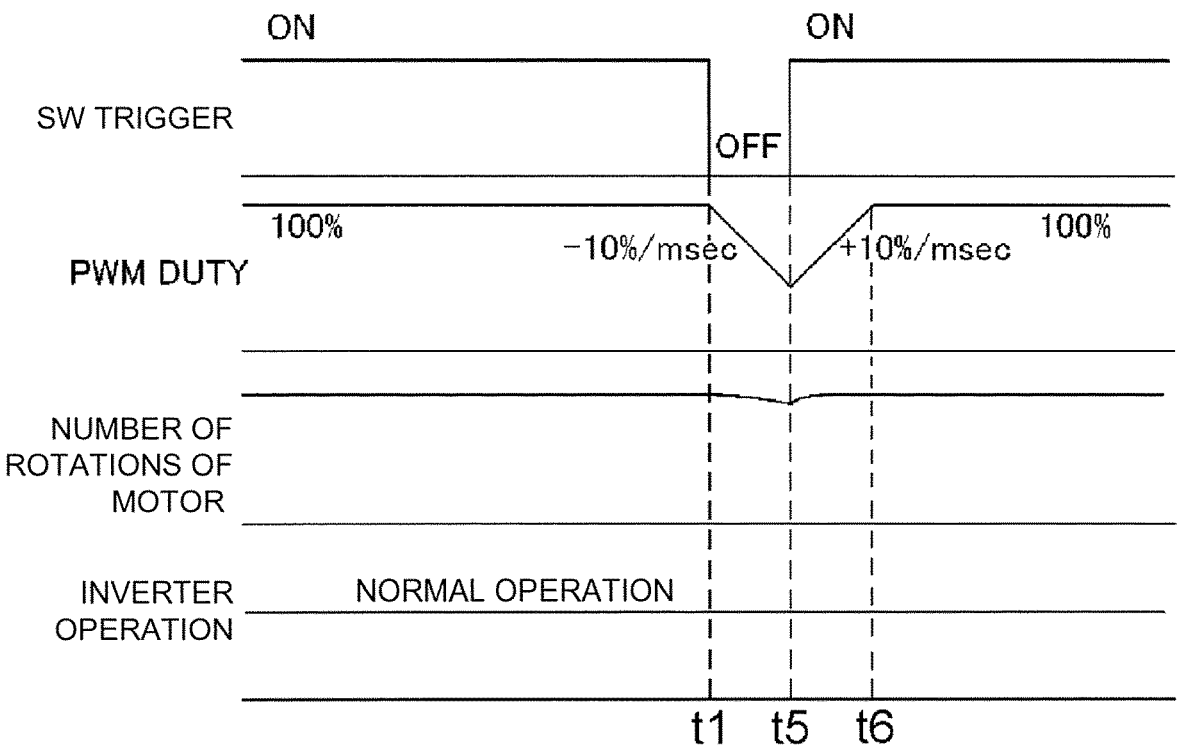
FIG. 8 is a third time chart for describing an operation of the grinder 1.

FIG. 8 is a third time chart for describing an operation of the grinder 1. The control unit 50 starts to lower a duty of a PWM signal applied to gates of switching elements constituting the inverter circuit 43 at a rate of 10% per second from 100% if the manipulation switch 5 has been turned off at the time t1. The control unit 50 starts to increase the duty of the PWM signal toward 100% at a rate of 10% per second if the manipulation switch 5 has been turned on at a time t5 at which the rotation rate of the brushless motor 6 is not the predetermined rotation rate or less during the lowering of the duty. The control unit 50 maintains the duty at 100% (normally drives the brushless motor 6) if the duty of the PWM signal is 100% at a time t6.

Figure 9:
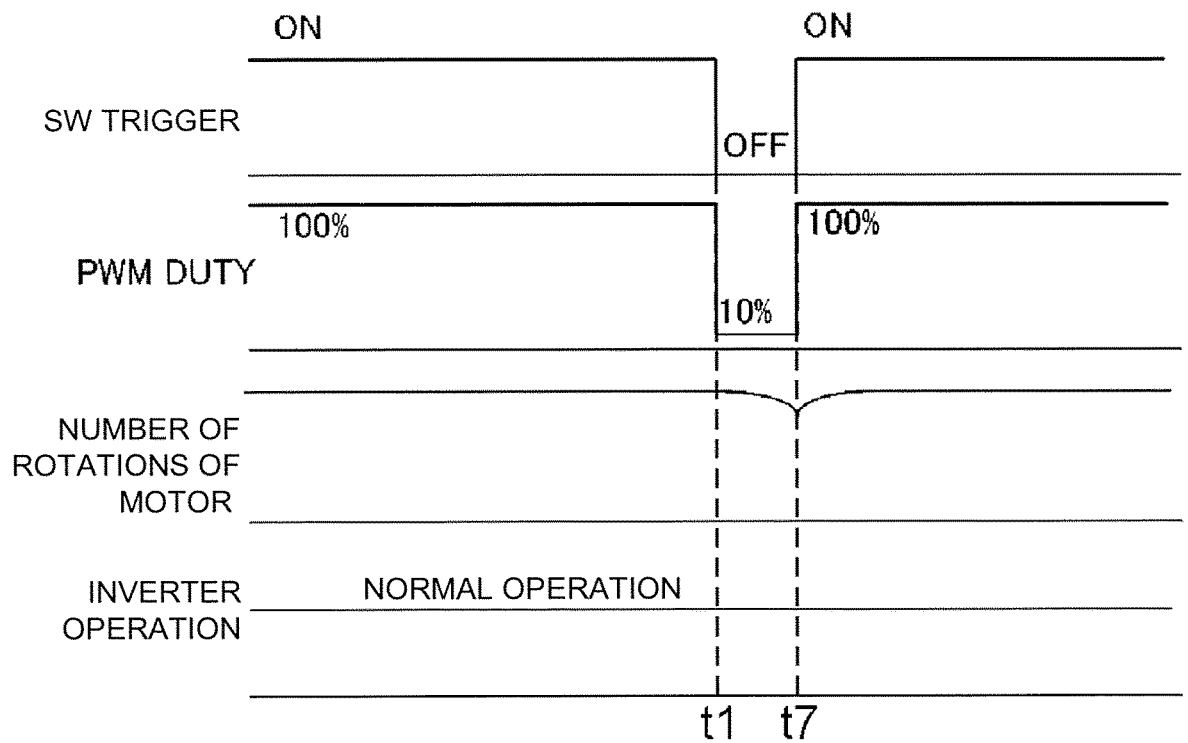
FIG. 9 is a fourth time chart for describing an operation of the grinder 1.

FIG. 9 is a fourth time chart for describing an operation of the grinder 1. The control unit 50 lowers a duty of a PWM signal applied to gates of switching elements constituting the inverter circuit 43 from 100% to 10% at once and then maintains the duty at 10% if the manipulation switch 5 has been turned off at the time t1. The control unit 50 increases the duty of the PWM signal from 10% to 100% at once and then maintains the duty at 100% (normally drives the brushless motor 6) if the manipulation switch 5 has been turned on at a time t7 at which the rotation rate of the brushless motor 6 is not the predetermined rotation rate or less.

According to this embodiment, the following effects can be accomplished.

(1) The control unit 50 does not immediately turn off the inverter circuit 43 (does not set the duty of the PWM signal to 0) after the manipulation switch 5 has been turned off, normally operates the inverter circuit 43 using a PWM signal with a low duty, waits until the rotation rate of the brushless motor 6 is the predetermined rotation rate or less, and then turns off the inverter circuit 43 (sets the duty of the PWM signal to 0). Thus, a high counter-electromotive voltage occurring in the stator coil 6e due to rotation of rotors (the rotor core 6b and rotor magnets 6c) caused by inertia after the manipulation switch 5 has been turned off can be suppressed from being applied to the switching elements Tr1 to Tr6 and thus a lifetime of the switching elements Tr1 to Tr6 can be lengthened and breakage thereof can be suppressed. In addition, it is possible to satisfy the user's need that he or she wants to perform a task using the inertia after the manipulation switch 5 has been turned off.

(2) The control unit 50 perfoms a restart process (S9 of FIG. 5) on the brushless motor 6 if the manipulation switch 5 is turned on when the rotation rate of the brushless motor 6 is not the predetermined rotation rate or less after the manipulation switch 5 has been turned off Thus, a time at which the brushless motor 6 returns to normal driving (S2 of FIG. 5) is shortened as compared with when the brushless motor 6 is activated again after the brushless motor 6 has completely stopped and thus operability is good.

(3) The control unit 50 does not perform braking until the rotation rate of the brushless motor 6 is the predetermined rotation rate or less. Thus, a large reaction due to the braking can be suppressed from being applied to the user and thus operability becomes better. Furthermore, looseness of wheel nuts used to fix the rotating tool to the spindle 20 at the time of braking can be minimized. Separate bolts or the like need not be provided to prevent the looseness of the wheel nuts, which is advantageous in reducing the number of parts.

Embodiment 2

Figure 10:
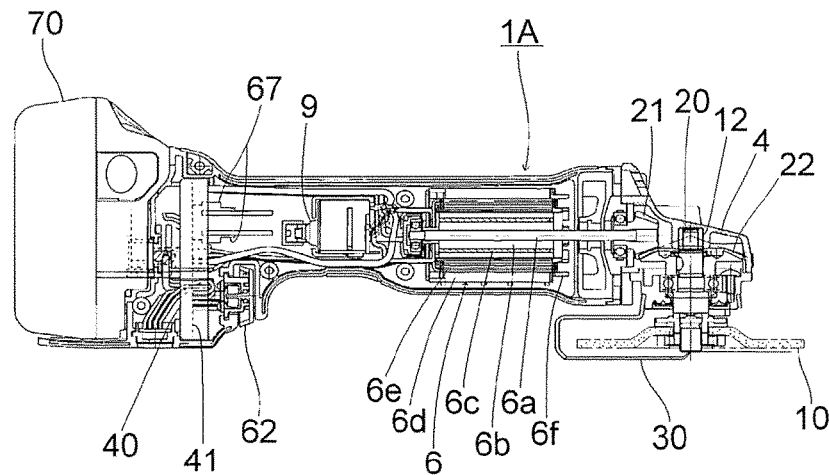
FIG. 10 is a side cross-sectional view of a grinder 1A serving as an electric tool related to Embodiment 2 of the present invention.

FIG. 10 is a side cross-sectional view of a grinder 1A serving as an electric tool related to Embodiment 2 of the present invention. While the grinder 1 of Embodiment 1 has a cord (AC driving), the grinder 1A of this embodiment does not have a cord (direct current (DC) driving) and operates using power supplied from a battery pack 70 which is detachably mounted. Manipulation of a manipulation switch (not shown) is mechanically detected by a switch mechanism 9. Note that the manipulation of the manipulation switch may be electromagnetically detected as in Embodiment 1. A switching element 67 mounted on the main board 41 corresponds to the switching elements Tr1 to Tr6 constituting the inverter circuit 43 of FIG. 4.

Figure 11:
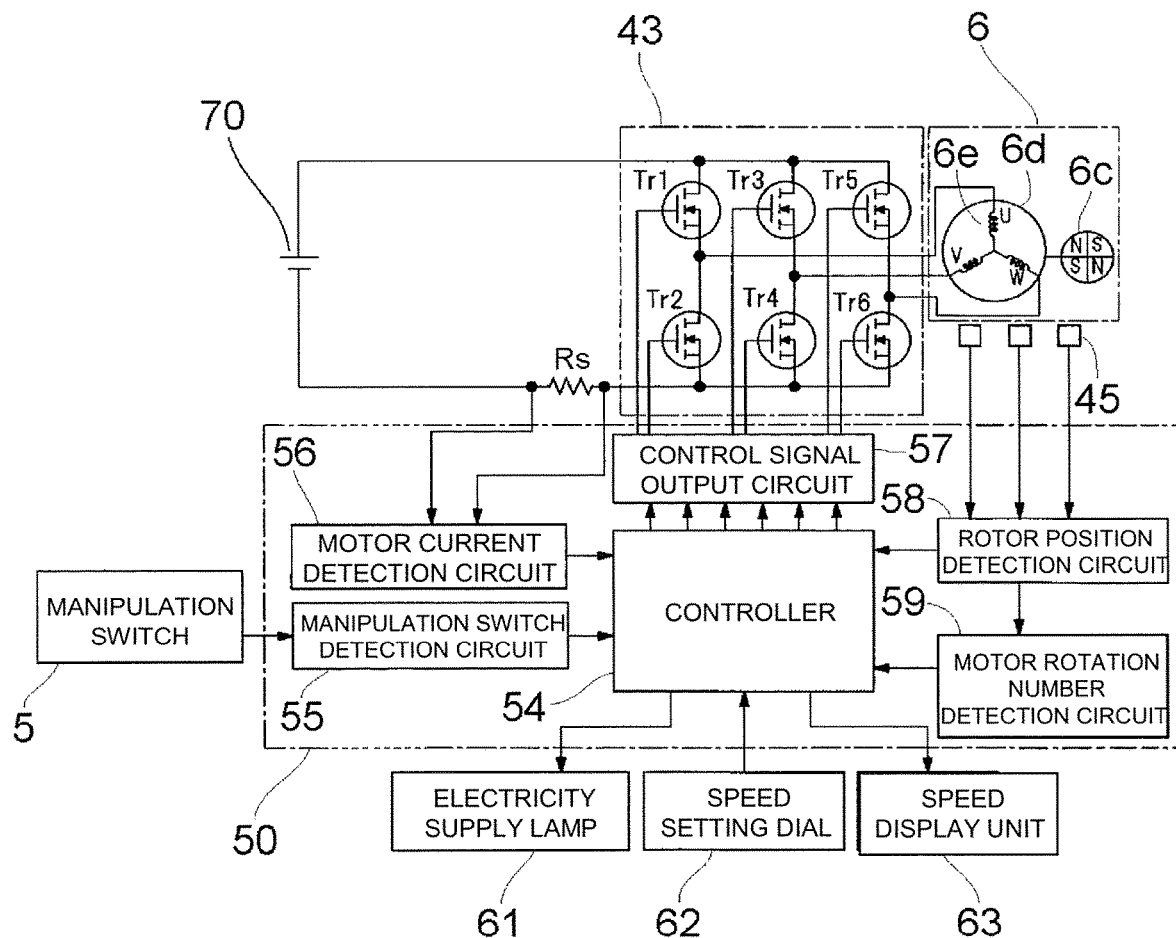
FIG. 11 is a control block diagram of the grinder 1A.

FIG. 11 is a control block diagram of the grinder 1A. This control block diagram and that of Embodiment 1 shown in FIG. 4 differ in that an AC power supply 51 is substituted for the battery pack 70 and the filter circuit 52, the diode bridge 42, and the power factor improvement circuit 53 are omitted, but the other aspects are the same.

A flow of control through the control unit 50 is the same as that of Embodiment 1 shown in FIG. 5. This embodiment can also accomplish the same effects as in Embodiment 1.

Embodiment 3

Figure 12:
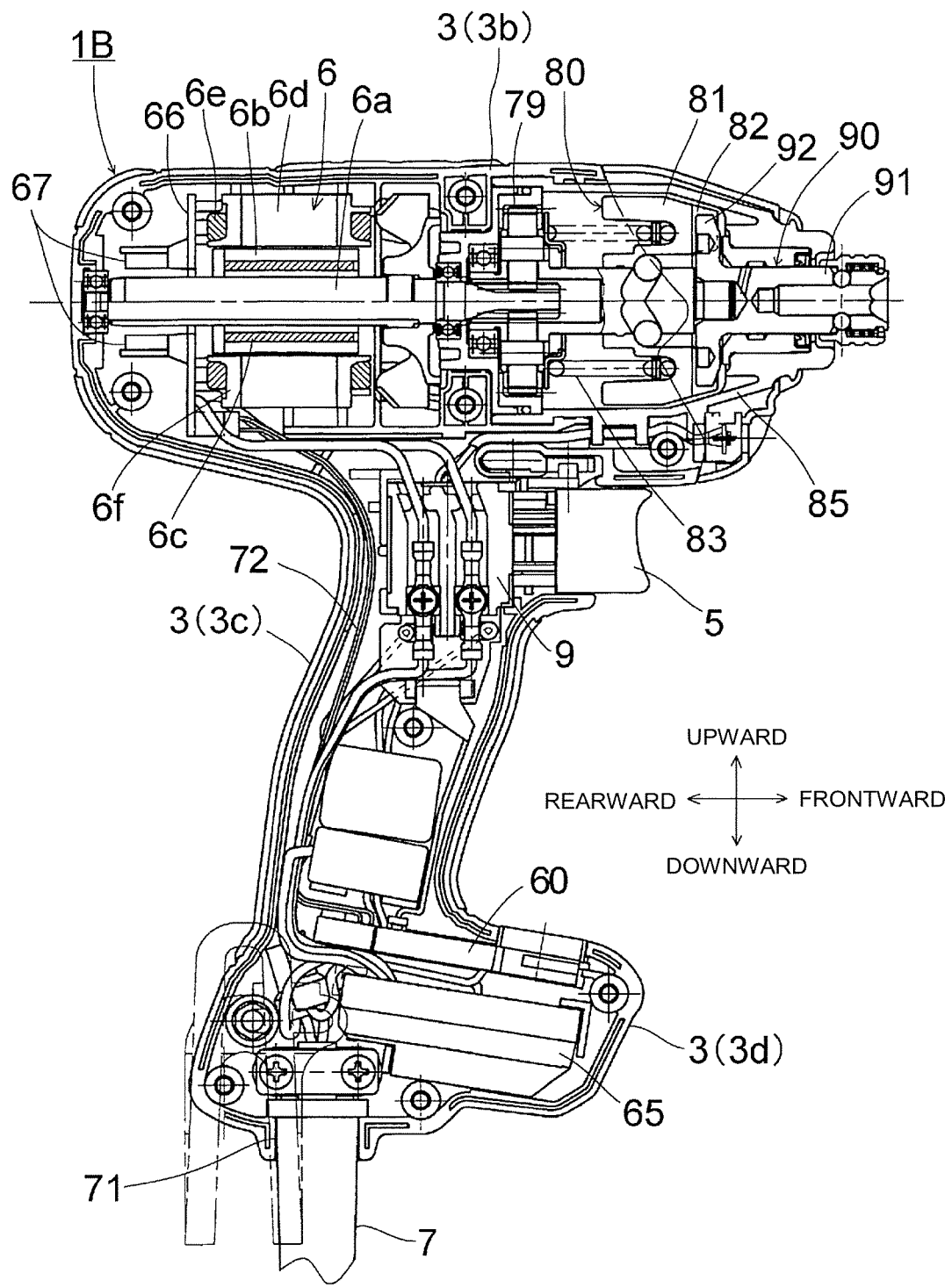
FIG. 12 is a side cross-sectional view of an impact driver 1B serving as an electric tool related to Embodiment 3 of the present invention.

FIG. 12 is a side cross-sectional view of an impact driver 1B serving as an electric tool related to Embodiment 3 of the present invention. In FIG. 12, forward, rearward, upward and downward directions are defined. In the impact driver 1B, a housing 3 has a body 3b configured to accommodate some of a brushless motor 6, a striking mechanism 80, and an output unit 90, a handle 3c with one end connected to the body 3b, and an accommodation part 3d formed on the other end of the handle 3c. Rotation of an output shaft 6a of the brushless motor 6 is decelerated via a planetary gear mechanism 79 and is applied to a hammer 81 of the striking mechanism 80.

The striking mechanism 80 has the hammer 81 located inside a hammer case 85 and a spring 83 configured to bias the hammer 81 forward. The hammer 81 has a front end with a colliding part 82 and is rotatably driven through an output shaft of the planetary gear mechanism 79. An anvil 91 constituting the output unit 90 has a rear side with a collision part 92. The spring 83 biases the hammer 81 forward such that the colliding part 82 collides with the collision part 92 in a rotation direction when the hammer 81 rotates. With such a configuration, a rotating striking force is given to the anvil 91 of the output unit 90 when the hammer 81 rotates. The hammer 81 can also move rearward against a biasing force of the spring 83. In addition, the hammer 81 moves rearward while rotating against the biasing force of the spring 83 after the colliding part 82 collides with the collision part 92. If the colliding part 82 passes over the collision part 92, elastic energy stored in the spring 83 is released, the hammer 81 moves forward, and the colliding part 82 collides with the collision part 92 again. The anvil 91 constituting the output unit 90 is rotatably axially supported on a distal end of the body 3b, that is, a front end side of the hammer case 85 and a tip tool (a rotating tool) can be detachably mounted on the anvil 91.

A manipulation switch (a trigger switch) 5 is provided on the handle 3c and the manipulation switch 5 is connected to a switch mechanism 9 accommodated inside the handle 3c. The user can switch between supply and cut-off of power to the brushless motor 6 through the manipulation switch 5. A power cord 7 is used by being connected to an AC power supply such as a commercial power supply drawn from an outlet 71 under the accommodation part 3d. A power supply box 65 accommodated inside the accommodation part 3d is connected to a proximal end side of the power cord 7. A rectifier circuit board on which a rectifier circuit configured to convert alternating current (AC) power input from the power cord 7 into direct current (DC) power is provided inside the power supply box 65. A control circuit board 60 on which a control unit configured to control a circuit or the like of the brushless motor 6 is also accommodated is provided inside the accommodation part 3d.

An inverter circuit controlled by the control unit is mounted in an inverter circuit board (a switching element board) 66 fixed to the body 3b and located behind the brushless motor 6. The inverter circuit has a field-effect transistor (FET) 67 serving as, for example, six switching elements configured to turn on/off supply of electricity to the brushless motor 6. The control circuit board 60 is electrically connected to the inverter circuit board 66 through a cable 72. A block configuration of the control unit is the same as that of Embodiment 1 shown in FIG. 4. A flow of control through the control unit is the same as that of Embodiment 1 shown in FIG. 5. Note that, in the case of an impact driver, unlike the grinder, a configuration and control concerning switching of a rotation direction of the brushless motor 6 is applied. In addition, since this is well known, description thereof will be omitted. This embodiment can also accomplish the same effects as Embodiment 1.

Although the present invention has been described above using the embodiments as examples, it can be understood by those skilled in the art that various modifications can be performed on constituent elements and processing processes of the embodiments within the scope disclosed in the claims. Hereinafter, modified examples will be mentioned.

An electric tool is not limited to a grinder and an impact driver and may be one of other impact tools such as an impact wrench and other types of electric tool, such as, for example, circular saws, concrete cutters, bush cutters, and lawn mowers. Parameters illustrated in the embodiments, for example, a duty of a PWM signal at the time of normally driving, a rate of decrease of a duty after the manipulation switch 5 has been turned off, a target value after the decrease, and the like are merely examples. In addition, the parameters may be arbitrarily set in accordance with experimental or required performance.

The invention claimed is:

1. An electric tool comprising:
   a manipulation switch;
   a brushless motor;
   a rotating tool driven through the brushless motor;
   a switching element configured to control supply of electricity to the brushless motor; and
   a control unit configured to control turning on/off of the switching element, wherein the control unit lowers a duty of a driving signal of the switching element to be lower than a duty when the manipulation switch is turned into a first state and down to a predetermined value larger than 0 if the manipulation switch is the first state, and then lowers the duty to 0, wherein the brushless motor stops through natural deceleration if the duty is 0.

2. The electric tool according to claim 1, wherein the control unit lowers the duty to 0 after maintaining the duty at the predetermined value and driving the brushless motor.

3. The electric tool according to claim 1, wherein the control unit lowers the duty to 0 if the rotation rate of the brushless motor is the predetermined rotation rate or less.

4. The electric tool according to claim 1, wherein the control unit controls electrical brake after maintaining the duty at the predetermined value and driving the brushless motor.

5. An electric tool comprising:
a manipulation switch;
a brushless motor;
a rotating tool driven through the brushless motor;
a switching element configured to control supply of electricity to the brushless motor; and
a control unit configured to control turning on/off of the switching element,
wherein the control unit lowers a duty of a driving signal of the switching element to a predetermined value larger than 0, maintains the duty at the predetermined value, drives the brushless motor, and then lowers the duty to 0 if the manipulation switch is a first state, and
wherein the brushless motor stops through natural deceleration if the duty is 0.

6. The electric tool according to claim 5, wherein the control unit lowers the duty from the predetermined value to 0 if a rotation rate of the brushless motor is a predetermined rotation rate or less, after the manipulation switch has been the first state and the duty has been lowered to the predetermined value.

7. The electric tool according to claim 5, wherein the control unit performs braking of the brushless motor after the manipulation switch has been the first state and the duty has been lowered to 0.

8. The electric tool according to claim 5, wherein the control unit gradually lowers the duty when the manipulation switch has been the first state and the duty has been lowered to the predetermined value.

9. The electric tool according to claim 5, wherein the control unit increases the duty to a target value if the manipulation switch is a second state, while the duty is being lowered to the predetermined value or is maintained at the predetermined value after the manipulation switch has been the first state.

10. An electric tool comprising:
a manipulation switch;
a brushless motor:,
a rotating tool driven through the brushless motor;
a switching element configured to control supply of electricity to the brushless motor; and
a control unit configured to control turning on/off of the switching element,
wherein the control unit lowers a duty of a driving signal of the switching element to a predetermined value larger than 0, and
wherein the control unit sets a rate of decrease of the duty when the manipulation switch has been the first state and the duty has been lowered to the predetermined value in accordance with a moment of inertia of the rotating tool.

11. An electric tool comprising:
a manipulation switch;
a brushless motor;
a rotating tool driven through the brushless motor;
a switching element configured to control supply of electricity to the brushless motor; and
a control unit configured to control turning on/off of the switching element,
wherein the control unit lowers a duty of a driving signal of the switching element to a predetermined value larger than 0 if the manipulation switch is changed from an on state to an off state and lowers the duty from the predetermined value to 0 if a rotation rate of the brushless motor is a predetermined rotation rate or less, and
wherein the brushless motor stops through natural deceleration if the duty is 0.

* * * * *